May 5, 1964     B. A. SARAFINAS     3,131,825

PLUG BUTTON, MOLDING, TUBING AND WIRING AND SIMILAR DEVICES

Filed Nov. 27, 1961     3 Sheets-Sheet 1

Inventor:
Bruno A. Sarafinas,
by Walter S. Jones
Atty.

Inventor:
Bruno A. Sarafinas,
by Walter P. Jones
Atty.

May 5, 1964  B. A. SARAFINAS  3,131,825
PLUG BUTTON, MOLDING, TUBING AND WIRING AND SIMILAR DEVICES
Filed Nov. 27, 1961  3 Sheets-Sheet 3

Inventor:
Bruno A. Sarafinas,
by Walter S. Jones
Att'y.

United States Patent Office 3,131,825
Patented May 5, 1964

3,131,825
PLUG BUTTON, MOLDING, TUBING AND WIRING
AND SIMILAR DEVICES
Bruno A. Sarafinas, Saugus, Mass., assignor to United-Carr Fastener Corporation, Cambridge, Mass., a corporation of Delaware
Filed Nov. 27, 1961, Ser. No. 155,098
3 Claims. (Cl. 220—24.5)

This invention aims to provide improvements in devices for attachment to apertured supports. The important part of each device is the portion by which the device is to be attached to a support. To this end it should be understood that the novel attaching means may be part of a plug button, as illustrated by the drawings. It may be a part of any other suitable devices; such as molding fasteners, tubing and wiring fasteners, and other similar devices when it is desirable to attach the device by a simple, inexpensive, positively acting, dust and waterproof device, having easy-to-operate attaching means.

An object of the invention is to provide a suitable device with an attaching means having a dished bottom portion that may be flexed from one position to another to simplify attachment of the device.

Another object of the invention is to construct the attaching portion of a device so that it has an expandable rim that may be expanded or contracted by a properly constructed, dished, flexible, web-like portion.

Another object of the invention is to provide the web-like portion of the attaching means with an operating element, when desired, whereby the web-like portion may be moved from one dished position to another.

A further important object of the invention is to provide a device with a flexible one-piece molded plastic attaching means having one or more or all of the features defined above.

Other objects of the invention will appear to those skilled in the art in the light of the following description and claims.

One of the embodiments of the invention is illustrated in FIGS. 1 through 7 in the nature of a plug button device for closing a hole in any desired article of manuture.

This particular device is shown as being formed as a one-piece molded plastic member, it being understood that the important part of the device is the attaching means that may be incorporated in other devices; such as molding fasteners, panel fasteners, tubing and wiring fasteners, etc.

When the device is a plug button as illustrated, it includes a base portion 1 preferably in the form of a flexible flange (FIG. 3), a dished attaching portion 2 extending from the base 1 and an expandable rim portion 3.

Figure 3:
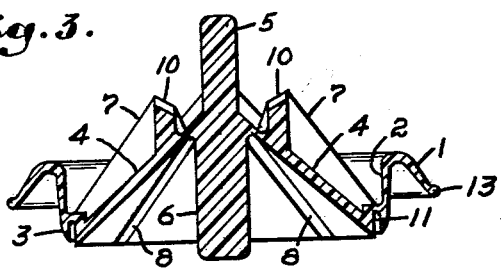
FIG. 3 is a section taken on the line 3—3 of FIG. 1.

The bottom of the dished attaching portion is in the nature of a flexible web-like portion 4 normally dished toward the plane of the base portion 1, as shown in FIG. 3. This flexible web-like portion 4 may be moved from a position shown in FIG. 5 to a position shown in FIG. 7. Thus the web-like portion has a toggle-like action and becomes set in one position or the other. To assist in moving the web-like portion 4 from one position to the other, a central pin 5 is provided on one side of the web-like portion and a second pin 6 is provided on the other side. Thus the pins 5 and 6 provide web-like operating elements, the purposes of which will be described more fully hereafter.

The web-like portion 4, in the device shown in FIGS. 1 through 7 inclusive, is provided with radial ribs 7 and with radial grooves 8. These ribs 7 and grooves 8 may be any suitable number, arrangement and shape depending upon the required toggle-like action and holding power of the device when it is to be applied or removed relative to a support 9, such as shown in FIGS. 4 through 7.

Figure 1:
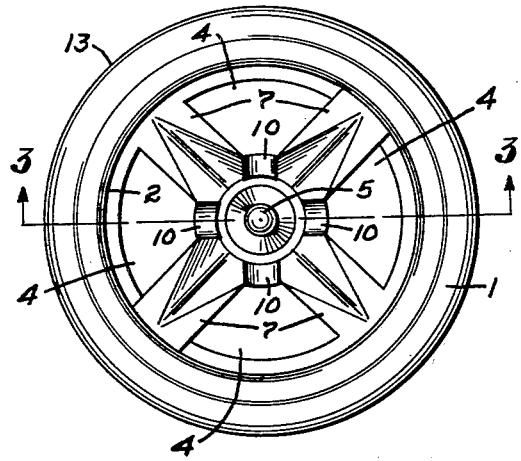
FIG. 1 is a top plan view of one form of plug button incorporating novel features of the invention.
Figure 2:
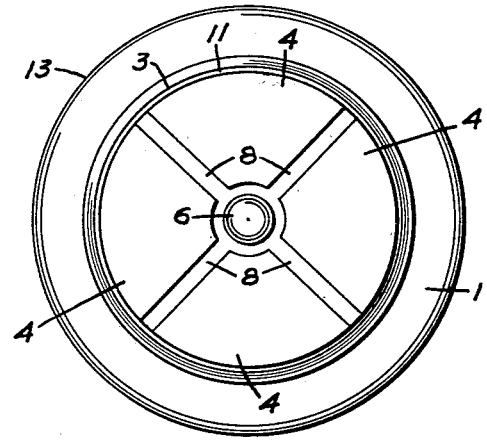
FIG. 2 is a bottom plan view of the device shown in FIG. 1.
Figure 4:
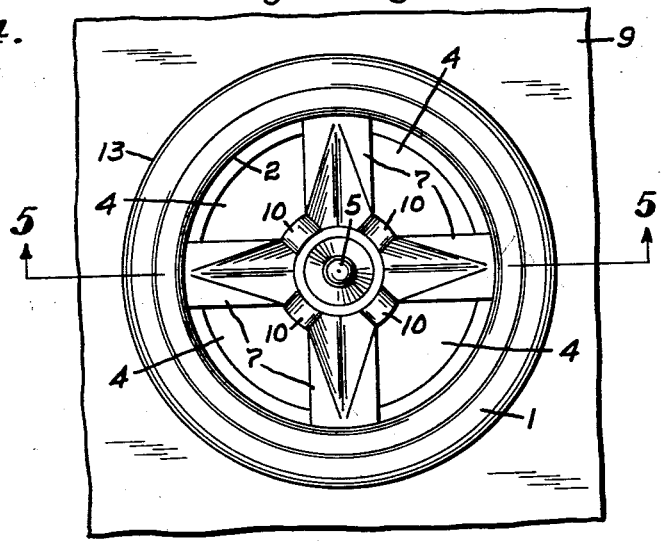
FIG. 4 is a top plan view of the device shown in the previously described figures as it appears when attached to a support.

In the device shown in FIGS. 1 through 7, the ribs 7 are shown in pairs on the upper surface of the web-like bottom portion 4 and the grooves 8 are arranged between the pairs of ribs 7 and in the lower surface of the bottom portion 4, as shown in FIGS. 1, 2 and 3. The ribs 7 are connected by wall portions 10 (FIGS. 1 and 3), each wall 10 connecting one rib 7 of one pair with another rib 7 of an adjacent pair, as best shown in FIGS. 1 and 4. Thus the ribs 7 and grooves 8 form hinge-like portions for controlling the action of the flexible bottom portion 4 when it is moved from one position to another.

An annular groove 11 is provided in the rim portion 3 (FIGS. 2 and 3) to provide for greater flexibility of the rim portion 3 for purposes to be described hereinafter.

Figure 5:
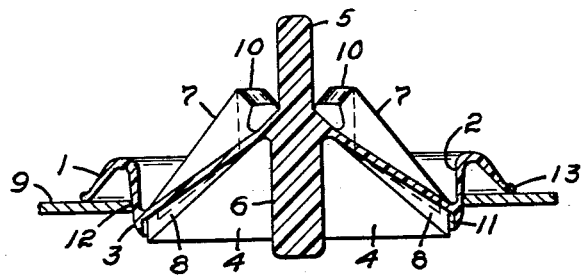
FIG. 5 is a section taken on the line 5—5 of FIG. 4 showing the relation of the part to the support when entered into an aperture and before final attachment.
Figure 6:
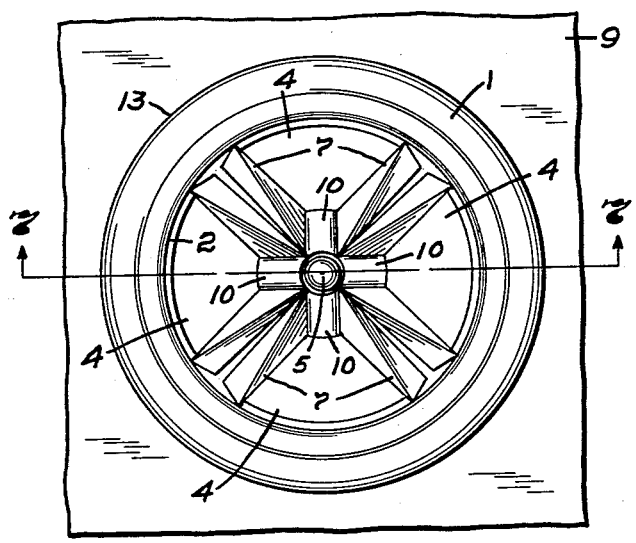
FIG. 6 is a plan view of the device shown as applied to a support and rotated 90 degrees from the position shown in FIG. 4.
Figure 7:
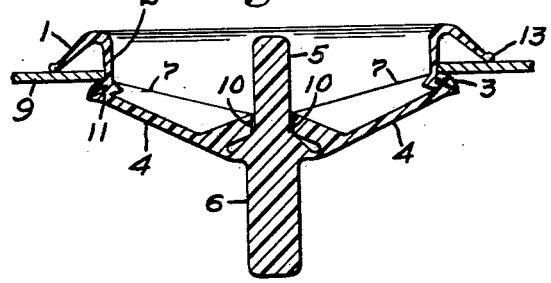
FIG. 7 is a section taken on the line 7—7 of FIG. 6 with the fastener in final applied position.
Figure 8:
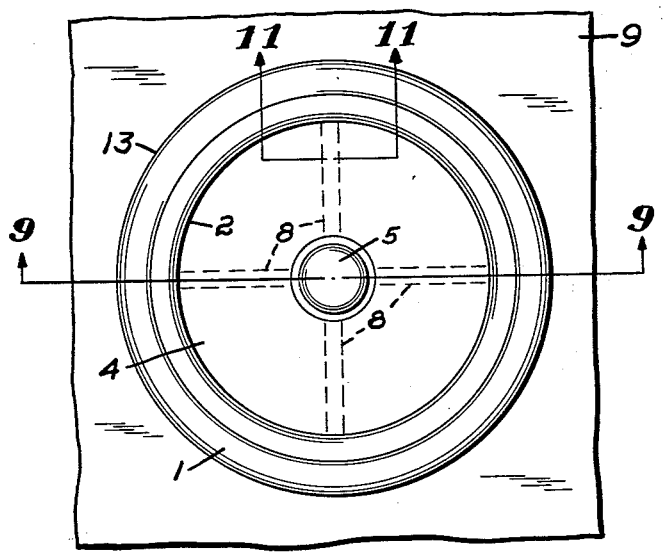
FIG. 8 is a plan view of another form of the invention in position upon a support, the radial ribs being omitted.
Figure 9:
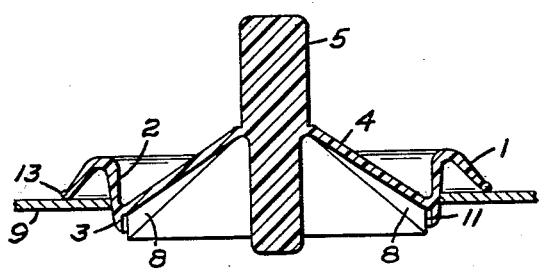
FIG. 9 is a section taken on the line 9—9 of FIG. 8 showing the relation of the part to the support in the initial applied position.

When it is desired to attach the device, described above, to the support 9, the attaching portion 2 is entered into an aperture 12 in the support 9 as shown in FIG. 5. Thereafter a hollow tool or a pair of pliers may be engaged with the pin portion 5 so that downward pressure may be applied to force the flexible web-like portion 4 into the position shown in FIG. 7 where the device is tightly secured to the support by means of the base portion 1 and the expanded rim portion 3. During this attaching action it will be understood that the wall portions 10 will contact with the pin portion 5 and the ribs 7 will be forced to yield as they pass the horizontal position, thereby causing the flexible bottom 4 to snap to the position shown in FIG. 7. The ribs 7, walls 10 and pin portion 5 thus cooperate to stiffen the bottom portion 4 so that the action of the bottom portion cannot be reversed to the position shown in FIG. 5 accidentally. This reverse movement can take place only when pressure is exerted on the pin portion 6 or a tool grasps the pin portion 5 and a strong pull is exerted. Thus it will be seen that the device is securely locked in position against accidental separation. The base 1 is preferably so shaped that an outer edge portion 13 bears against the outer face of the support 9 and the flexible rim portion 3 is pressed outwardly to overlap the inner face of the support 9 to provide a secure attachment of the device. The base 1 and rim portion 3 may accommodate themselves to substantial variations in thicknesses of supporting members 9 as will be readily understood and the groove 11 in the rim portion 3 will be seen as providing flexible length to the rim portion 3 while being "backed up" by the peripheral edge of the attaching portion. This construction also lends itself to making a water and dust tight closing of the aperture 12 in the support 9.

The device shown by FIGS. 8 through 12 is similar to the one shown and described in connection with FIGS. 1 through 7 except that the pairs of ribs 7 have been eliminated. In this type of construction the grooves 8 have been retained, but they may be of any number and shape. It has been found that devices constructed like that shown in FIGS. 8 through 12 prove satisfactory for some devices in certain applications particularly when the holding power of the device to the support need not be as great as with some devices, such as shown in FIGS. 1 through 7.

This ribless device may be applied in the same general manner as described above in connection with the first disclosed device; and, therefore, it is unnecessary to describe the attachment thereof in detail here.

Figure 11:
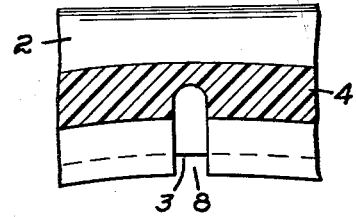
FIG. 11 is an enlarged section taken on the line 11—11 of FIG. 8 showing the arrangement of the flexible web-like portion and one of the grooves as it would appear in FIG. 9.
Figure 10:
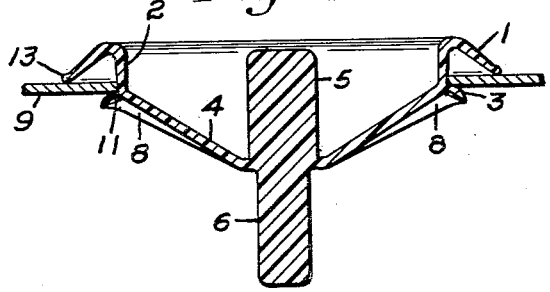
FIG. 10 is a section similar to FIG. 9 showing the relation of the part of the support in final applied position.
Figure 12:
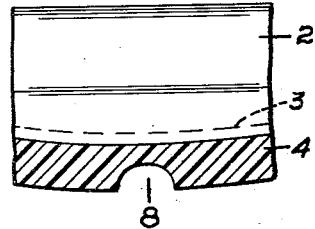
FIG. 12 is a section similar to FIG. 11 showing the arrangement of the web-like portion and a groove as they would appear when in the position shown in FIG. 10.

FIGS. 11 and 12 are included in the drawing to illustrate how the grooves change shape when the bottom 4 of the device is in the two different positions. Thus it will be understood by those skilled in the art that the grooves 8 may be useful in providing a satisfactory action for the flexible web-like portion 4 by thinning the material at desired places.

While the pins 5 and 6 are useful in assisting in attaching the devices to supporting members, they may be eliminated in certain contemplated constructions. It is also contemplated that either one or the other of the pins 5 and 6 may be eliminated in certain constructions. Furthermore, the diameters of the pins 5 and 6 may vary individually or relative to each other depending upon the type of applying or removing tool that is to be used and the holding strength of the device or the pressure required to force the flexible bottom portion 4 from one position to another.

It will be understood that the devices illustrated and described above may be made from various compositions of moldable plastic material and preferably one-piece constructions although not necessarily so limited. It will also be understood that, while there has been illustrated and described two constructions of the novel devices, variations in the design relative to the arrangement of the various elements and even elimination of some of the elements is contemplated; the invention being best defined by the following claims.

I claim:

1. Device for attachment to an apertured support, said device having a base portion for engagement with a support adjacent to an aperture therein and a molded plastic attaching means extending from said base portion for entrance into an aperture in a support to hold the device in assembly therewith, said attaching means being in the form of a dished flexible web-like portion normally dished in one direction and a support engaging rim portion adapted to grip a support when said dished flexible web-like portion is moved into an oppositely dished direction and radial ribs extending from said flexible web-like portion and a pin extending from said web-like portion, at least one pair of said radial ribs connected by a wall, said wall adapted to engaging said pin when the web-like portion is inverted.

2. A device for attachment to an apertured support, said device having a base portion for engagement with a support adjacent to an aperture therein and a molded plastic attaching means extending from said base portion for entrance into an aperture in a support to hold the device in assembly therewith, said attaching means being in the form of a dished flexible web-like portion normally dished in one direction and a support engaging expandable rim portion adapted to be expanded to grip a support when said dished flexible web-like portion is moved into an oppositely dished direction and radial ribs extending from said flexible web-like portion and a pin extending centrally from said web-like portion, each of said radial ribs connected to another by a wall, each of said walls adapted to engaging said pin when the web-like portion is inverted.

3. A combination of a support having an aperture formed therein, and a device for attachment to an apertured support, said device having a base portion engaged with a support adjacent to said aperture therein and a molded plastic attaching means extending from said base portion for entrance into said aperture in said support to hold the device in assembly therewith, said attaching means being in the form of a dished flexible web-like portion normally dished in one direction and a support engaging rim portion adapted to grip a support when said dished flexible web-like portion is moved into an oppositely dished direction and radial ribs extending centrally from said web-like portion, at least one pair of said radial ribs connected by a wall, said wall adapted to engaging said pin when the web-like portion is inverted.

References Cited in the file of this patent

UNITED STATES PATENTS

| 2,671,574 | Wolfe | Mar. 9, 1954 |
| 3,080,993 | Livingstone | Mar. 12, 1963 |

FOREIGN PATENTS

| 153,832 | Sweden | Mar. 20, 1956 |